(12) United States Patent
Ishikawa et al.

(10) Patent No.: US 6,279,334 B1
(45) Date of Patent: Aug. 28, 2001

(54) REFRIGERATING APPARATUS FOR VEHICLES

(75) Inventors: Tutomu Ishikawa; Kunio Miyazaki, both of Saitama (JP)

(73) Assignee: Zexel Cold Systems Company, Saitama (JP)

( * ) Notice: Subject to any disclaimer, the term of this patent is extended or adjusted under 35 U.S.C. 154(b) by 0 days.

(21) Appl. No.: 09/446,872

(22) PCT Filed: Jun. 29, 1998

(86) PCT No.: PCT/JP98/02893

§ 371 Date: Dec. 29, 1999

§ 102(e) Date: Dec. 29, 1999

(87) PCT Pub. No.: WO99/00632

PCT Pub. Date: Jan. 7, 1999

(30) Foreign Application Priority Data

Jun. 30, 1997 (JP) .................................................. 9-189269
Jun. 30, 1997 (JP) .................................................. 9-189270

(51) Int. Cl.[7] ..................................................... B60H 1/32
(52) U.S. Cl. ............................................... 62/239; 62/275
(58) Field of Search .............................. 62/239, 262, 263, 62/275, 276

(56) References Cited

U.S. PATENT DOCUMENTS

| | | | |
|---|---|---|---|
| 3,353,368 | * 11/1967 | Dodge, III et al. | ............ 62/276 |
| 3,421,340 | * 1/1969 | Von Berg | ............ 62/239 |
| 4,348,871 | * 9/1982 | Androff | ............ 62/239 |
| 4,736,597 | * 4/1988 | Anderson et al. | ............ 62/239 |
| 4,811,569 | * 3/1989 | Welch et al. | ............ 62/239 |

FOREIGN PATENT DOCUMENTS

| | | |
|---|---|---|
| 56-8286 | 6/1954 | (JP) . |
| 61-29652 | 2/1986 | (JP) . |
| 63-99475 | 4/1988 | (JP) . |
| 2-71074 | 3/1990 | (JP) . |
| 3-18476 | 2/1991 | (JP) . |
| 7-280417 | 10/1995 | (JP) . |
| 3028158 | 6/1996 | (JP) . |
| 9-99773 | 4/1997 | (JP) . |

* cited by examiner

*Primary Examiner*—William E. Tapolcai
(74) *Attorney, Agent, or Firm*—Wenderoth, Lind & Ponack L.L.P.

(57) ABSTRACT

In a refrigerating device for a vehicle (1) major components for performing a refrigerating cycle, i.e., an evaporator (19), an evaporator fan (25), a condenser (15) and a condenser fan (23), except for the condenser, are preliminarily attached to an evaporator housing (29) to form an integral refrigerating unit (9). Thus, the refrigerating device may be mounted easily to a refrigeration container (3) easily and quickly only by fitting the refrigerating unit (9) having the evaporator housing as a frame into an opening portion (27) of the refrigeration container (3). Further, because the evaporator (19) and the evaporator fan (25) are not protruded from an inner wall of the refrigeration container, the capacity of the refrigeration container is never reduced.

21 Claims, 11 Drawing Sheets

REFRIGERATING APPARATUS FOR VEHICLES

TECHNICAL FIELD

The present invention relates to a refrigerating device for a vehicle, the refrigerating device being mounted on a refrigeration container of the vehicle for refrigerating an interior of the refrigeration container.

BACKGROUND ART

Japanese Patent Application Laid-Open No. HE19-99773 discloses a conventional refrigerating device for a vehicle of this type. The refrigerating device comprises an evaporator mounted in a refrigeration container (a refrigeration chamber) of a vehicle, and a condenser mounted outside the refrigeration container such that the condenser is protruded from a front face of the refrigeration container. The condenser and evaporator are mounted on protruded portions of the refrigeration container with bolts and nuts, respectively.

In the refrigerating device disclosed in the above patent application, because the condenser and evaporator are protruded from the refrigeration container in the forward direction, reduction of the capacity of the refrigeration container can be prevented. However, since the condenser and evaporator have to be mounted separately on the refrigeration container, there is a problem that mounting operations of the condenser and evaporator are troublesome so that it takes much labor and time for the mounting operations. Particularly, the mounting operation for the evaporator and the like need to be carried out in the inside of the refrigeration container. On the other hand, the mounting operation for the condenser and the like need to be carried out from the outside of the refrigeration container. Further, other components for performing the refrigerating cycle must be mounted separately. Thus, the mounting operations become complicated. Further, since the evaporator and the like to be mounted on the inside of the refrigeration container must be carried out within a narrow space extended form the refrigerating chamber, the mounting operation is difficult and it takes a long time to perform the mounting operation.

Accordingly, an object of the present invention is to provide a refrigerating device for a vehicle, which can be mounted easily and quickly.

DISCLOSURE OF THE INVENTION

The present invention provides a refrigerating device for a vehicle to refrigerate the interior of a refrigeration container of the vehicle. The refrigerating device includes an evaporator, an evaporator fan, a condenser and a condenser fan. The refrigerating device further comprises an evaporator housing which is a separate member from the refrigeration container. The evaporator and the evaporator fan are installed in the evaporator housing, and the condenser and the condenser fan are mounted on the exterior of the evaporator housing so as to construct an integrated refrigerating unit. When the refrigerating unit is fitted into an opening portion of the refrigeration container for the vehicle, the evaporator and the evaporator fan are located on the outside of an inner wall surface of the refrigeration container.

According to the present invention, of major components performing the refrigerating cycle, the evaporator, evaporator fan, condenser and condenser fan, except for the condenser, are preliminarily installed on the evaporator housing to form an integral refrigerating unit. Therefore, the refrigerating unit having the evaporator housing as a mounting frame can be mounted on the refrigeration container easily and quickly only by fitting the refrigerating unit into the opening portion of the refrigeration container. Further, because the evaporator and evaporator fan are not protruded from an inner wall of the refrigeration container, the capacity of the refrigeration container is never reduced. In this case, although the evaporator and the like to be disposed in the refrigeration container are fitted into a narrow concavity of the container, these components are previously mounted as the unit at the outside of the refrigeration container and therefore the mounting operation is achieved easily.

It is desirable that the to-be integrated components for performing the refrigerating cycle may include all auxiliaries such as a receiver tank, an accumulator, a relay box and the like.

According to the present invention, a motor for the condenser fan is mounted in the evaporator housing.

Therefore, the condenser fan is fixed to the evaporator housing, so that the mounting stability of the condenser fan is excellent and the condenser fan never obstructs airflow for the condenser. Thus, a passing efficiency of airflow through the condenser can be improved.

According to the present invention, the evaporator housing has a cover for covering the condenser and condenser fan provided outside. Air vents are formed on a front face and top face of the cover in view of a traveling direction of the vehicle, and a drain hole is formed just below the top air vent.

Essentially, to achieve heat exchange in the condenser by airflow, the air vents are formed in the front face and the top face of the cover. Even if snow or the like enters into the cover through the top air vent, it falls to the drain hole in the cover and is discharged through the drain hole. Therefore, standing water in the cover is prevented.

According to the present invention, the evaporator housing has a fixing structure for fixing the evaporator housing to the opening portion of the refrigeration container. The fixing structure makes the refrigerating unit mount on the refrigeration container by fixing both edge portions of the evaporator housing with bolts and nuts.

Thus, the evaporator housing may be mounted easily and quickly only by fixing both right and left edge portions of the unit to the opening portion of the refrigeration container with the bolts and nuts. Further, because the locations of the bolts and nuts are restricted to both the right and left edge portions of the unit, a person can mount the unit with an easy working posture and its mounting operation is easy.

According to the present invention, the evaporator has a recess intersecting an airflow direction to the evaporator, and a heater is disposed in the recess.

Thus, because the evaporator may have a heater for warming the interior of the refrigeration container in the recess thereof, no other space for the heater along with the unit is necessary so that the refrigerating unit also has a heating function that can be formed in a compact structure.

According to the present invention, the refrigerating unit has a drainpipe at a bottom of the evaporator housing and extending from the evaporator housing to the outside thereof. The drainpipe is made of a resin material.

Thus, because the drainpipe extending to the outside of the evaporate housing is made of resin material having a low heat conductivity, a heat bridge in which outside heat is transmitted through the drainpipe into the refrigeration container to lower the refrigerating efficiency of the container can be prevented, so that the refrigeration efficiency can be raised.

According to the present invention, the condenser is disposed perpendicularly to the traveling direction of the vehicle.

Thus, because the condenser is placed vertically, the width of the unit can be reduced as compared to a conventional case where it is placed obliquely, so that the unit can be formed in a compact structure.

According to the present invention, each of the evaporator, condenser, evaporator fan and condenser fan may be of an arbitrary number. Therefore, mounting locations corresponding to the arbitrary number for each of the components are preliminarily provided.

Thus, nuts are preliminarily arranged at the locating positions corresponding to a case where two evaporator fans are to be mounted or a case where three evaporator fans are to be mounted or the like, depending on the specifications of a refrigerating unit. A refrigerating unit corresponding to any specification may be assembled easily.

According to the present invention, an inner wall of the evaporator housing has a face inclined downwardly toward the interior of the refrigeration container. A drain pan for receiving water is provided at a lower end portion of the inclined face. Each fin of the evaporator has a first inclined edge on the lower end thereof. The first inclined edge is downwardly inclined from the interior side of the refrigeration container to the vicinity of the inclined face of the evaporator housing.

Thus, in the evaporator, droplets falling along the surface of each fin arrive at the lower end. Thereafter, the droplets flow downward along the first inclined edge and are collected and grow a large water-drop at the lower part of the evaporator housing. Then, the water-drop falls from the evaporator easily. The falling water-drop is led along the inclined face of the evaporator housing to the drain pan and discharged. Therefore, blocking of the airflow by freezing of water adhering to the lower edges of the fins can be prevented, so that reduction of heat exchange efficiency is prevented. Further, because the droplets on the first inclined edge are led to the vicinity of the inclined face of the evaporator, splashes of water caused by its direct falling on the drain pan are prevented.

According to the present invention, the lower end of the fin further has a second inclined edge. The second inclined edge is inclined downward from a side of the fin located at the inner wall side of the evaporator housing toward the first inclined edge so that a corner is formed where the first inclined edge and the second inclined edge meet each other.

Thus, droplets flow along the first inclined edge and second inclined edge of the lower end of the fin so that these droplets are collected and from a water-drop at the lower corner. Then, the water-drop is led from the lower corner to the inclined face of the evaporator housing. Because the corner where the first inclined edge and second inclined edge meet each other is formed at the lower end of the fin, each inclination angle of the edges can be set large. Thus, the water at the lower end of the fin can be collected easily and the effective area of the fin can be increased.

According to the present invention, a defrosting heater is disposed on the inclined face of the evaporator housing.

Thus, because the defrosting heater is provided on the inclined face of the evaporator housing for directing the water, frost on the inclined face of the evaporator housing is removed so that airflow resistance by frost during a refrigerating operation is reduced. Thus, reduction of the heat exchange efficiency can be prevented.

According to the present invention, the evaporator housing has a drainpipe at a lower portion thereof. The drain pan is projected from the lower portion of the evaporator housing toward the interior side of the refrigeration container. Further, the drain pan is downwardly inclined toward the drainpipe.

Thus, the water received in the drain pan is directed along the inclined face of the drain pan and discharged through the drainpipe. Therefore, the water in the drain pan can be discharged easily so that accumulation of water in the drain pan is prevented.

According to the present invention, the evaporator, the drain pan, the drainpipe and the defrosting heater are incorporated in the evaporator housing as an integral refrigerating unit and this refrigerating unit is mounted on the refrigeration container of the vehicle.

Thus, because respective components including the drain pan and the like are incorporated in the integrated refrigerating unit, an operation for mounting respective components separately in the refrigeration container is not necessary and the mounting of the refrigerating unit is easy.

BEST MODE FOR CARRYING OUT THE INVENTION

Hereinafter, an embodiment of the present invention will be described in detail with reference to the accompanying drawings FIGS. 1–17. A refrigerated vehicle 1 according to an embodiment of the present invention has a refrigeration container (having a heating function also in this embodiment) 3 on a carrier deck 7 thereof, and a refrigerating unit 9 is disposed so as to protrude toward the side of a cabin 11.

Figure 4:
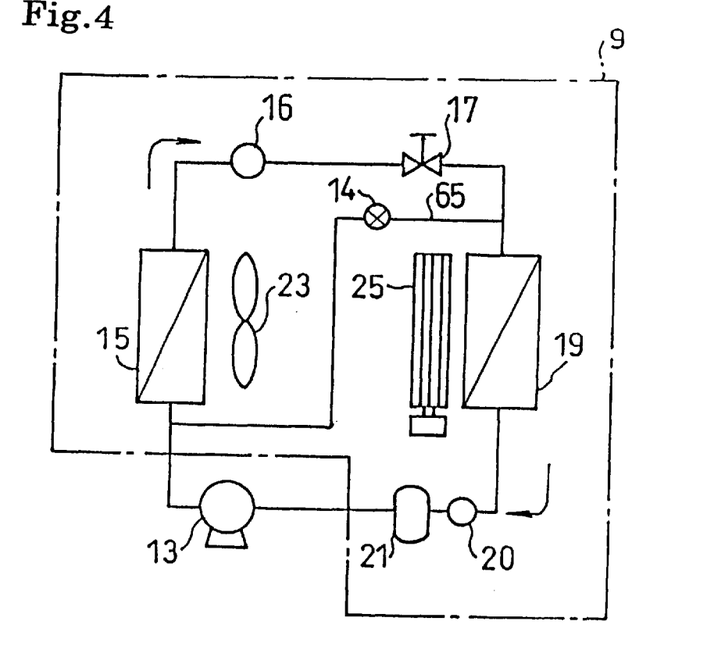
FIG. 4 is a circuit diagram for a refrigerating cycle.

Here, a refrigerating cycle performed by the refrigerating unit 9 will be described. As shown in FIG. 4, the refrigerating cycle is performed by a compressor 13, a condenser 15, a drier 16, a reduction valve 17, an evaporator 19, a receiver tank 20 and an accumulator 21. Refrigerant flows in this order so as to refrigerate the evaporator 19. A hot gas pipe 65 is provided and extends from an outlet of the compressor 13 to the evaporator 19. As a result, the evaporator 19 can be defogged by opening/closing a solenoid valve 14. Further, the condenser 15 has a condenser fan 23 and the evaporator 19 has an evaporator fan 25, with these fans feeding air to carry out heat exchange with the refrigerant.

The refrigerating unit 9 has a unit structure in which the above components that perform the refrigerating cycle are integrated except for the compressor 13, which is mounted on the refrigeration container 3. The compressor 13 is installed on the carrier deck 7 or cabin 11 of the vehicle because the compressor 13 is interlockingly driven with an engine of the vehicle 1.

Figure 1:
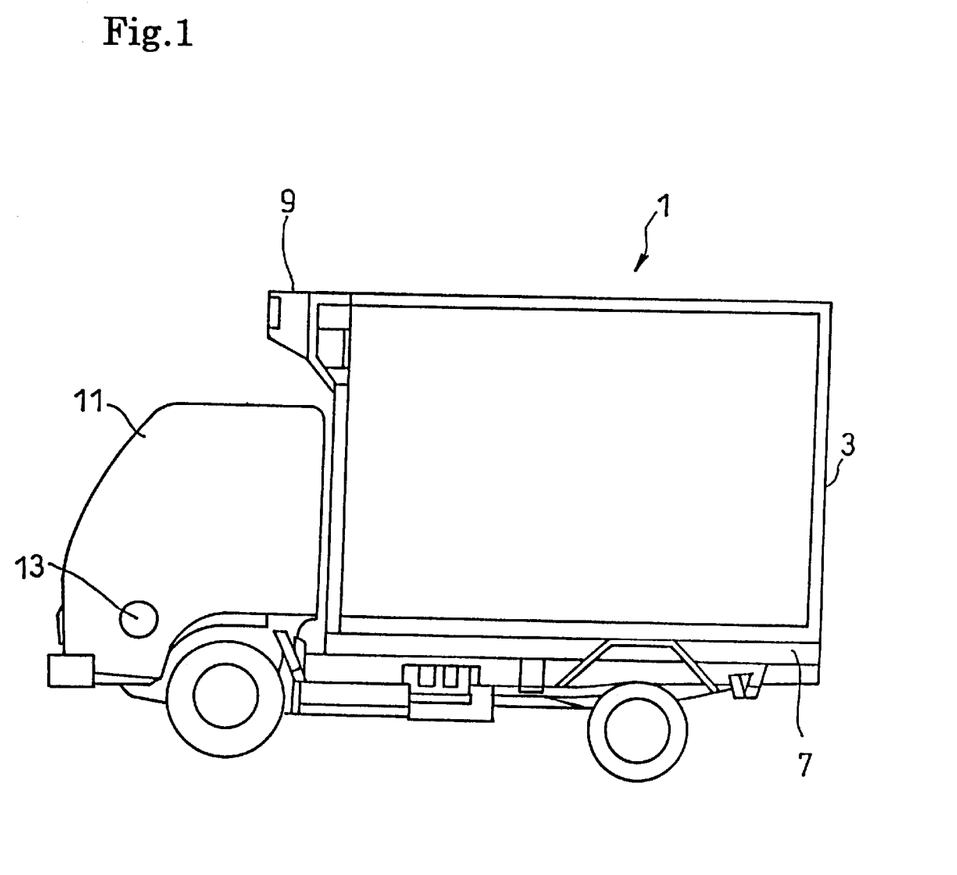
FIG. 1 is a schematic view showing a mounting state of the refrigerating device for a vehicle according to an embodiment of the present invention.
Figure 2:
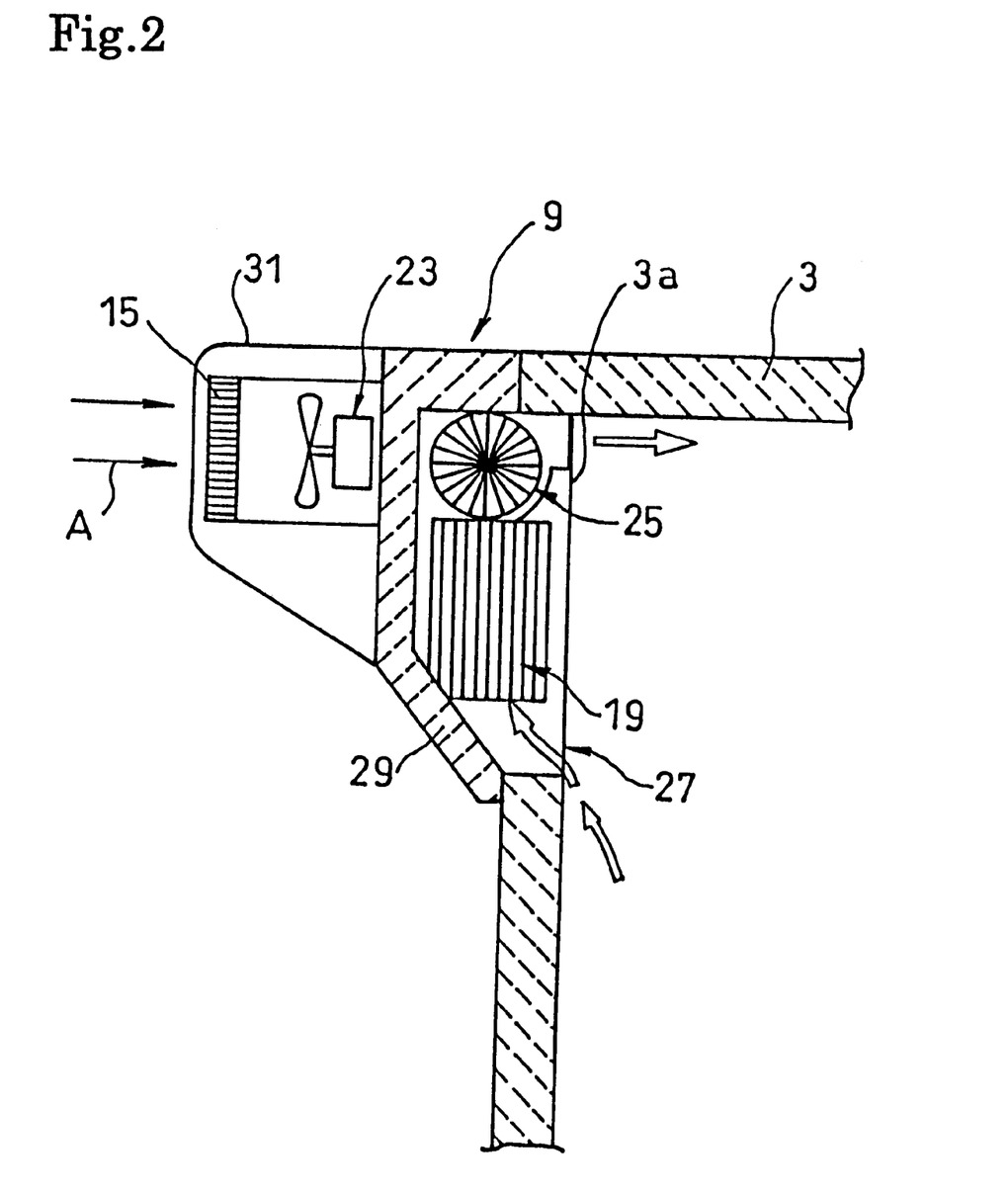
FIG. 2 is a sectional view showing a schematic structure of a refrigerator unit in the mounting state.
Figure 3:
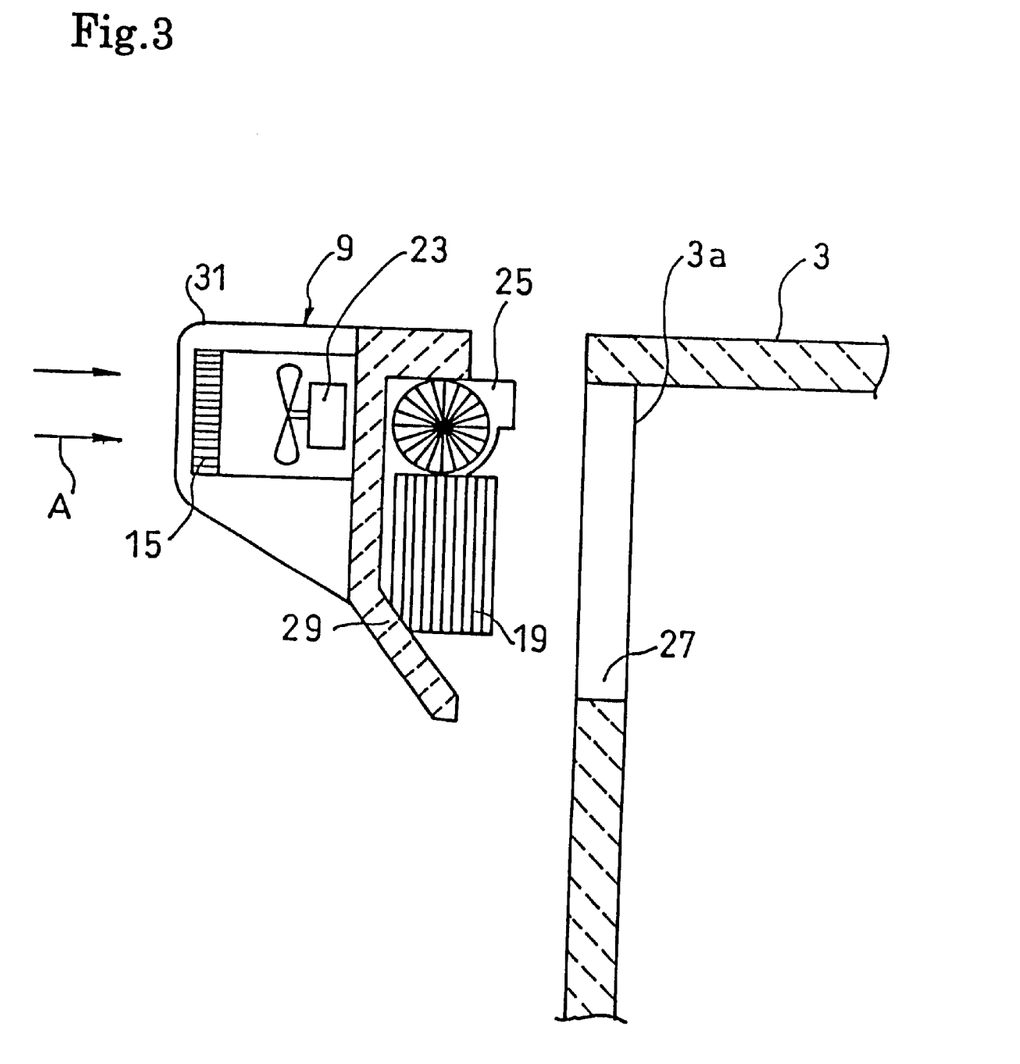
FIG. 3 is a sectional view showing the schematic structure of the refrigerating unit shown in FIG. 2.

This refrigerating unit 9 is mounted on the cabin side of the refrigeration container 3 as shown in FIGS. 2 and 3. An opening portion 27 is preliminarily defined at a locating position on the refrigeration container 3. In the refrigerating unit 9, the evaporator 19 and the evaporator fan 25 are housed in a hollow space defined by an evaporator housing 29. Because the evaporator 19 and the evaporator fan 25 are accommodated in the space of the evaporator housing 29, when the refrigerating unit 9 is mounted, these components are located at the outside of an inner wall 3a of the refrigeration container 3. Therefore, these components do not decrease a storage capacity of the refrigeration container 3.

The evaporator housing 29 includes insulator material or resin foam filled between aluminum plates so as to provide insulation. The evaporator fan 25 is disposed above the evaporator 19 so as to blow air into the refrigeration container 3 from a upper part of the container after the air passes through the evaporator 19 in the upper direction and is then subjected to heat exchange.

The condenser 15 and the condenser fan 23 are mounted on an exterior of the evaporator housing 29 such that the condenser 15 and condenser fan 23 are protruded to the side of the cabin 11. According to this embodiment, as the condenser 15 is used a high efficiency condenser. This condenser is disposed substantially at a right angle with respect to an airflow direction A so as to reduce the protruding space, thereby achieving a small size of the refrigerating unit 9.

Figure 5:
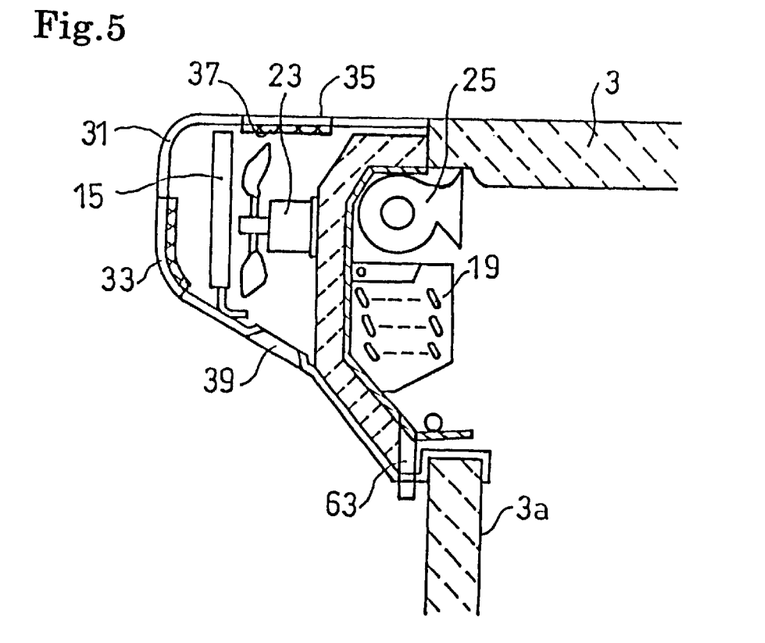
FIG. 5 is a longitudinal sectional view showing a detailed structure of the refrigerating unit of FIG. 2.
Figure 15:
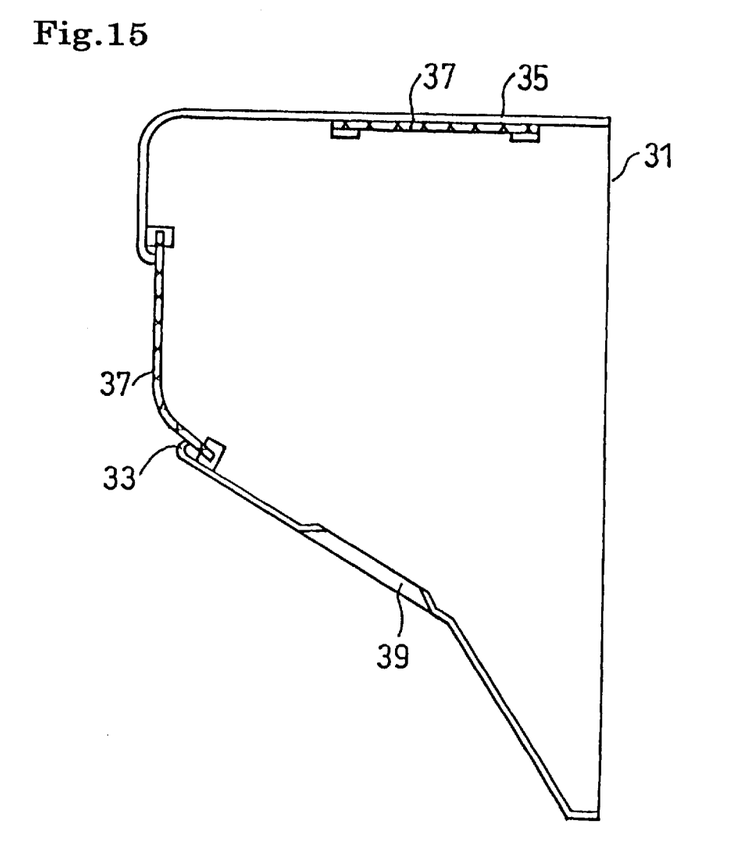
FIG. 15 is a sectional view of a cover.
Figure 16:
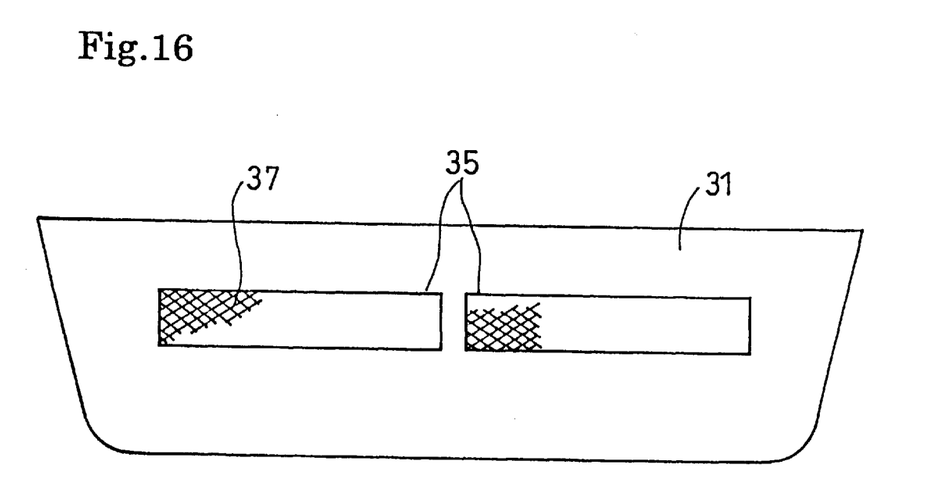
FIG. 16 is a plan view of the cover.

Further, a cover 31 for covering the condenser 15 and the condenser fan 23 is attached to the evaporator housing 29. The evaporator housing 29 and the cover 31 together form a housing that accommodates the evaporator 19, evaporator fan 25, condenser and condenser fan 23. As shown in FIGS. 5, 15 and 16, this cover 31 has air vents 33 and 35 provided on a front face thereof on the cabin side and a top portion thereof. Air received in the traveling direction of the vehicle 1 is passed through the condenser 15 and after the heat exchange, is discharged upwardly. The air vent 35 on the top portion and the air vent 33 on the front face are covered each with a net 37 to prevent dust, snow or the like from entering inside the cover 31. A discharge port or drain hole 39 is formed at a position corresponding to just below the air vent 35 on the top portion in a bottom of the cover 31. Even if rain or snow falls through the air vent 35 on the top portion via the net 37, the rain or snow is not deposited but discharged out of the cover 31. Therefore, no net is provided over the discharge port 39 on the bottom, so that snow or the like can be discharged easily without being caught by the net.

Figure 6:
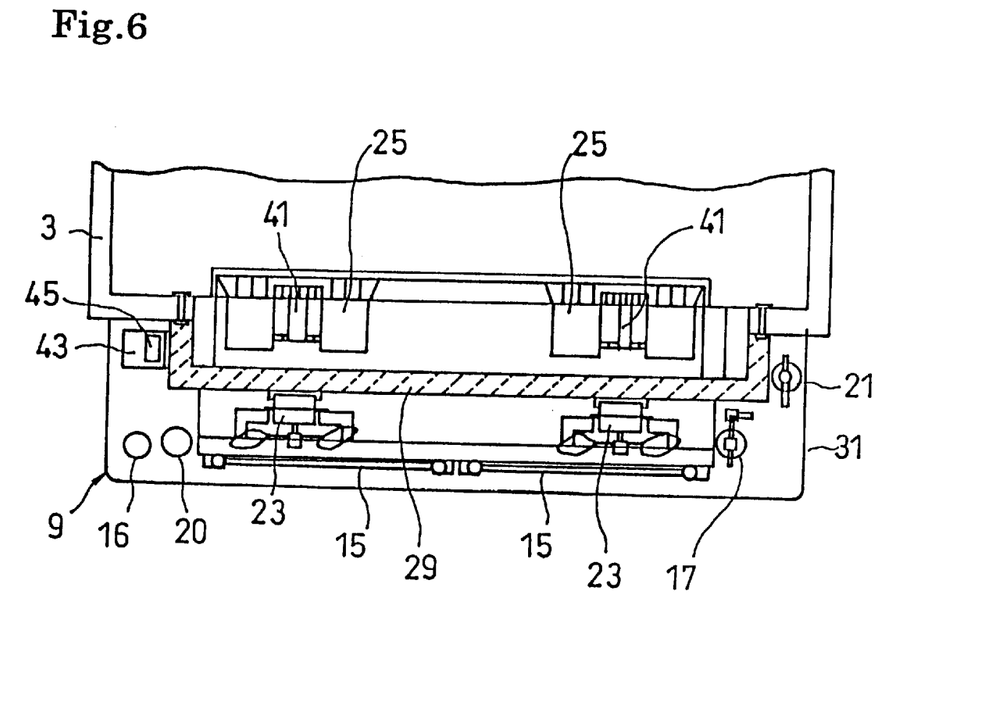
FIG. 6 is a lateral sectional view showing a detailed structure of the refrigerating unit of FIG. 2.

A structure of the refrigerating unit 9 will be described in detail with reference to FIG. 6. According to this embodiment, two evaporator fans 25 are disposed side by side. Each fan 25 includes a pair of silocco fans (cross flow fans). The pair of the silocco fans shares a single motor 41.

Two condensers 15 are disposed side by side on the exterior of the evaporator housing 29. Two fans 23 corresponding to the condensers 15, respectively, are fixed on the evaporator housing 29. Because the condensers 15 are mounted on the evaporator housing 29, the secure mounting of these condensers 15 can be obtained. Further, the airflow is not obstructed by the motors or the like, so that an excellent heat exchange is achieved.

The evaporator housing 29 includes an accumulator 21, a drier 16, a receiver tank 20, a reduction valve 17, a relay box 43, a fuse box 45 and the like as well as the major components for the refrigerating cycle described above. Most of the refrigerating components except the compressor 13 are assembled into the refrigerating unit 9. By assembling most of the refrigerating components except the compressor 13 into a single unit, that unit 9 itself only can be attached to and fixed on the refrigeration container 3, so that the unit 9 can be mounted on the vehicle 1 easily and in a short time. Further, because the respective components are assembled into the unit 9, maintenance thereof is easy.

Figure 7:
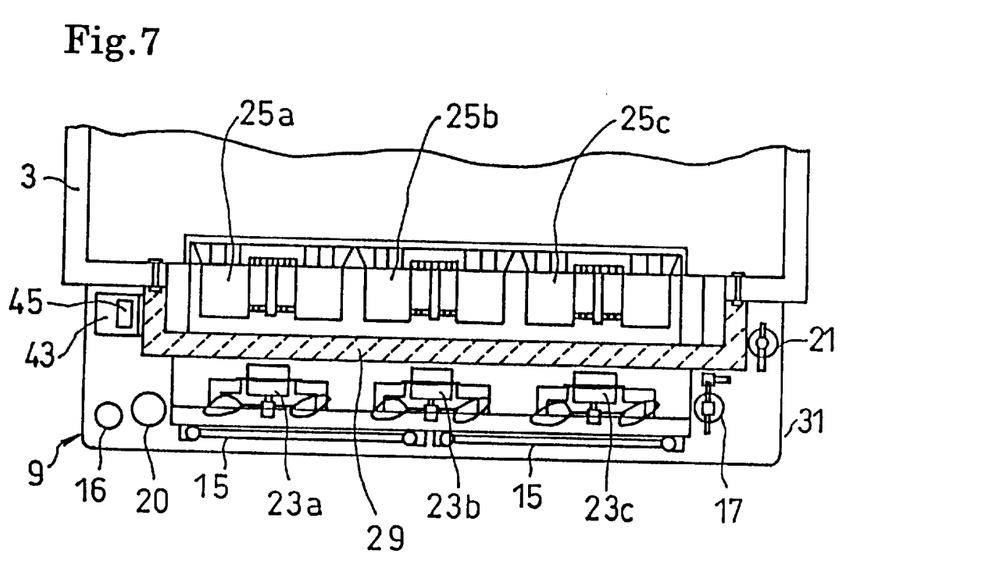
FIG. 7 is a sectional view showing a modification of the refrigerating unit.
Figure 8:
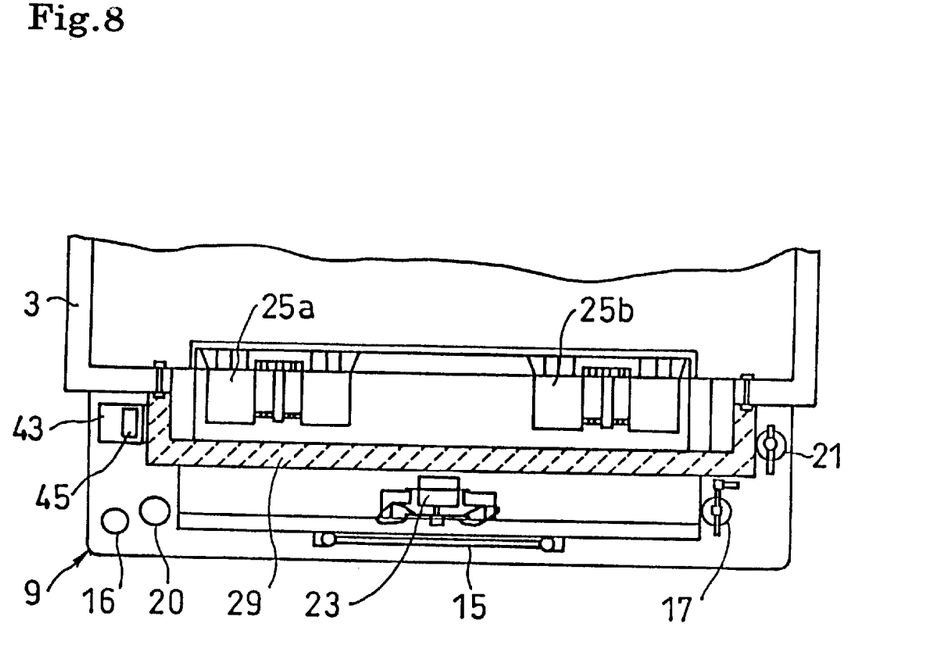
FIG. 8 is a sectional view showing another modification of the refrigerating unit.
Figure 9:
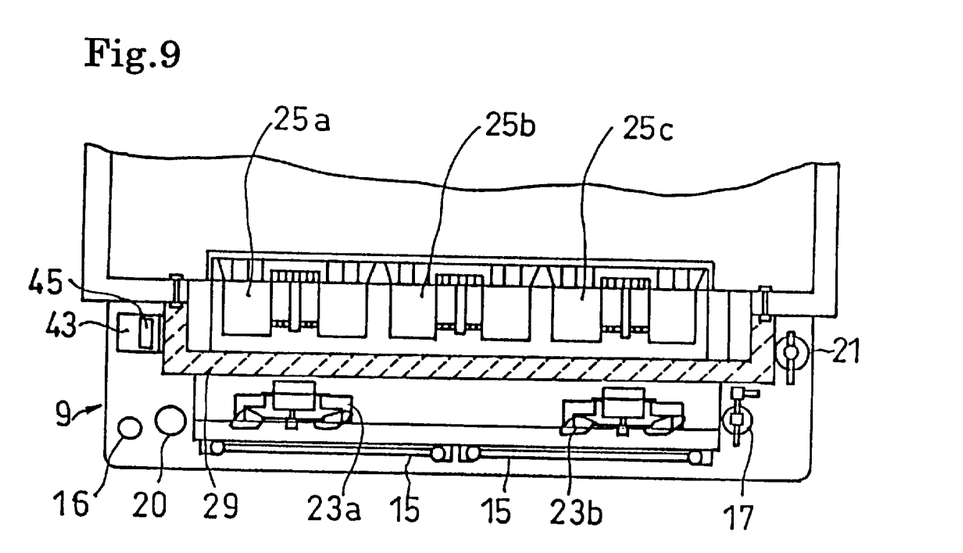
FIG. 9 is a sectional view showing yet another modification of the refrigerating unit.

Further, according to this embodiment as shown in FIGS. 7 to 9, in this refrigerating unit 9, numbers of the condensers 15 and the evaporator fans 25 may be changed, respectively, depending on a capability and performance requested by a refrigerated vehicle. In FIG. 7, three evaporator fans 25a, 25b and 25c and three condenser fans 23a, 23b and 23c are provided. In FIG. 8, two evaporator fans 25a and 25b, a condenser 15, and a condenser fan 23 are provided. In FIG. 9, three evaporator fans 25a, 25b and 25c, and two condenser fans 23a and 23b are provided. Nuts and bolt holes are preliminarily provided at locations corresponding to various specifications, where the evaporator fans 25 and the condenser fans 23 may be mounted in the evaporator housing 29. These components can be located at any position. Therefore, the evaporator housing 29 may be used for various specifications and the refrigerating components may be easily fixed on the housing, depending on the specification.

Figure 10:
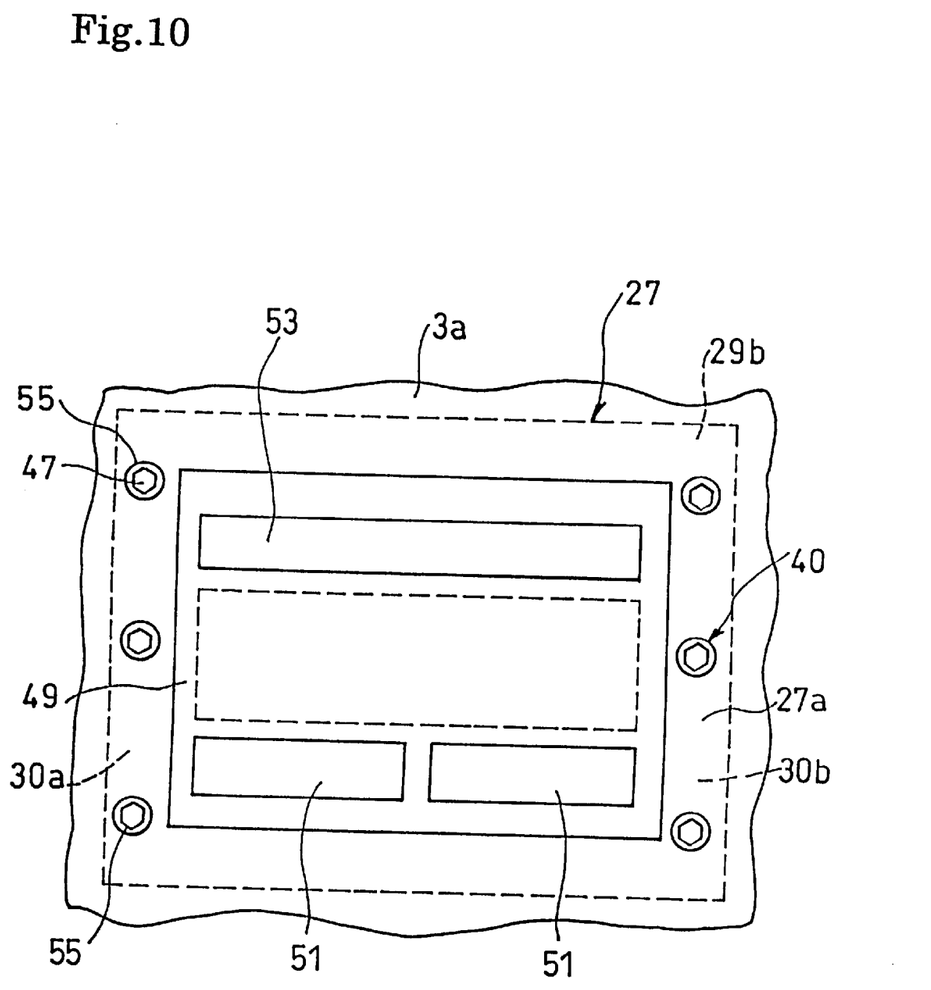
FIG. 10 is a plan view as viewed from the inside of the refrigeration container showing a mounting state of the refrigerating unit.

Next, mounting of the refrigerating unit 9 on the refrigeration container 3 will be described. FIG. 10 shows an interior of the refrigeration container 3 with the refrigerating unit 9. According to this embodiment, a periphery 29b of the evaporator housing 29 is formed in a rectangular shape. The periphery of the housing 29 is fixed to the opening portion 27 of the refrigeration container 3 with bolts 47 at three positions, upper, middle and lower of each of the right and left side of the periphery, totaling six positions. That is, the refrigerating unit 9 may be mounted easily only by tightening the bolts 47 on both the sides from inside of the refrigeration container 3. Because tightening of the bolts 47 is carried out at three positions on each of the right and left sides upon the mounting, the bolt tightening is not necessary on upper and lower edges of the periphery. Therefore, a necessary working posture of the worker is not tight and the mounting operation of the unit is easy.

Referring to FIG. 10, reference numeral 49 denotes an interior cover, reference numerals 51 denote air intakes, and reference numeral 53 denotes an air outlet. Putty 55 around each of the bolts 47 prevents leakage of air from the container.

Figure 11:
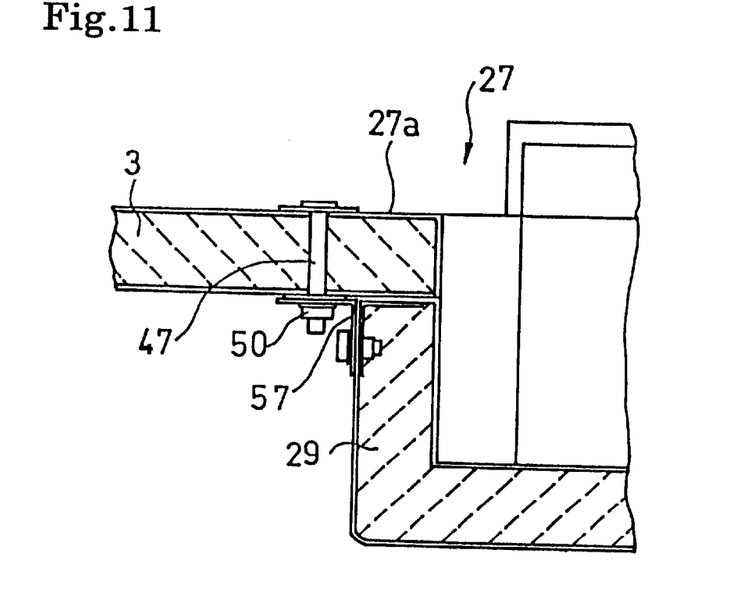
FIG. 11 is a sectional view showing a fixing portion between the refrigerating unit and the refrigeration container.
Figure 12:
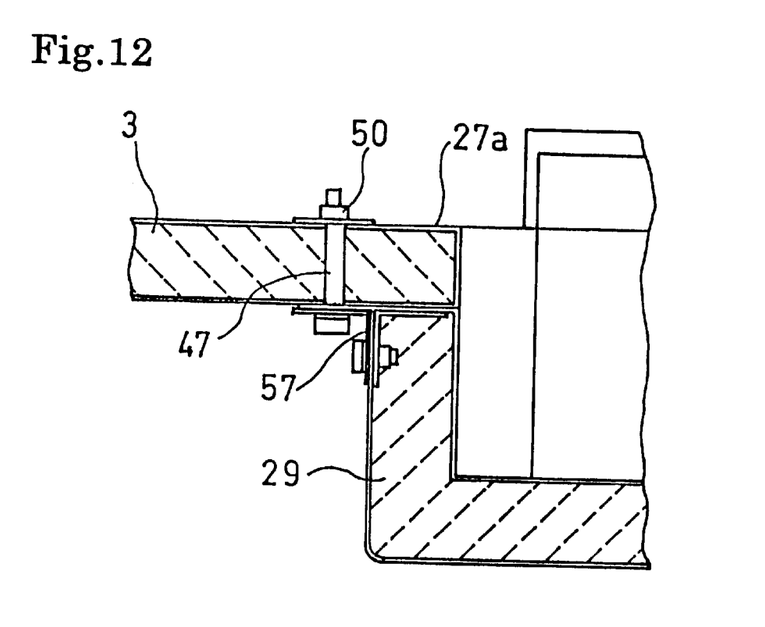
FIG. 12 is a sectional view showing a modification of the fixing portion between the refrigerating unit and the refrigeration container.
Figure 13:
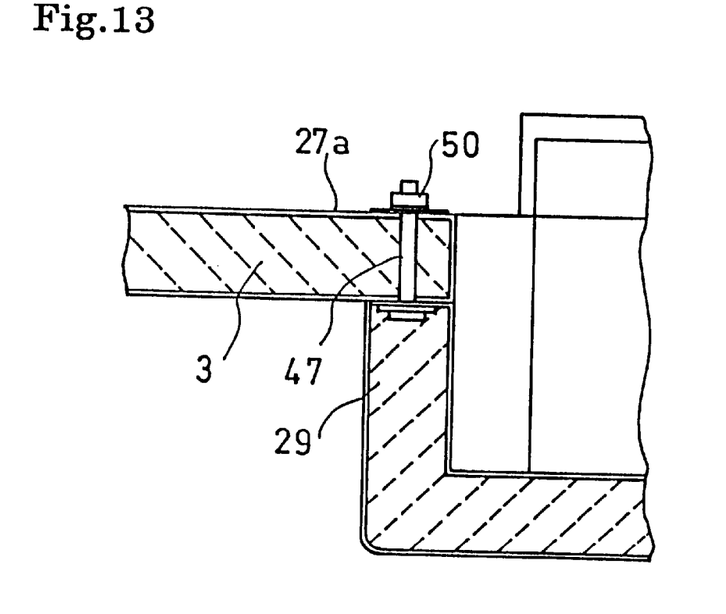
FIG. 13 is a sectional view showing another modification of the fixing portion between the refrigerating unit and the refrigeration container.
Figure 14:
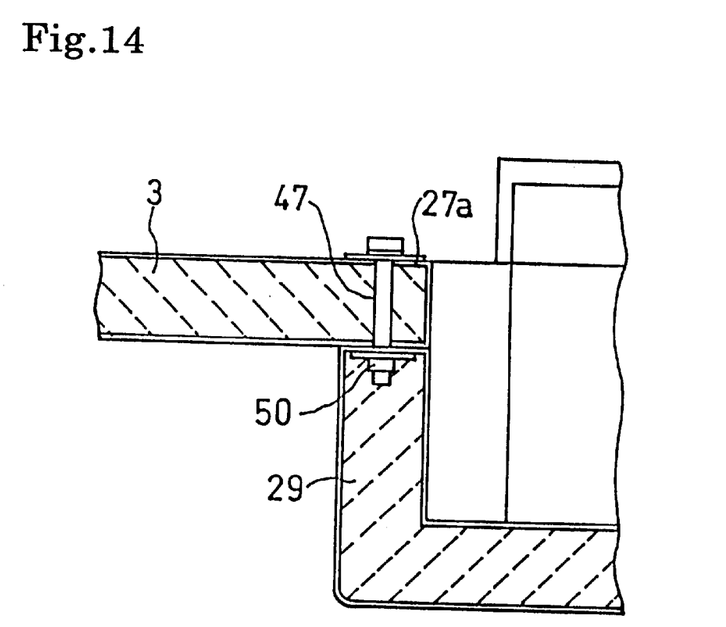
FIG. 14 is a sectional view showing yet another modification of the fixing portion between the refrigerating unit and the refrigeration container.

As for fixing the evaporator housing 29 to the periphery 27a of the opening portion 27 of the refrigeration container 3, as shown in FIG. 11, the evaporator housing 29 is fixed by bolts 47 inserted from the interior of the refrigeration container through angle members 57. These angle members 57 are provided on the exterior of the container 3. The fixing manner for the refrigeration container 3 is not restricted to the abovementioned one, but may be modified in various types. For example, as shown in FIG. 12, it is permissible to insert the bolts 47 from the outside of the refrigeration container 3 where the evaporator housing 29 is located and fix the unit by tightening the nuts 50 in the refrigeration container 3. It is also permissible to embed heads of the bolts 47 in an end face of the evaporator housing 29 and fix the unit by tightening the nuts 50 from the inside of the refrigeration container as shown in FIG. 13. Further, it is also permissible to embed nuts 50 on the end face of the evaporator housing 29 as shown in FIG. 14, and fix the nuts by inserting bolts from the inside of the refrigeration container.

Figure 17:
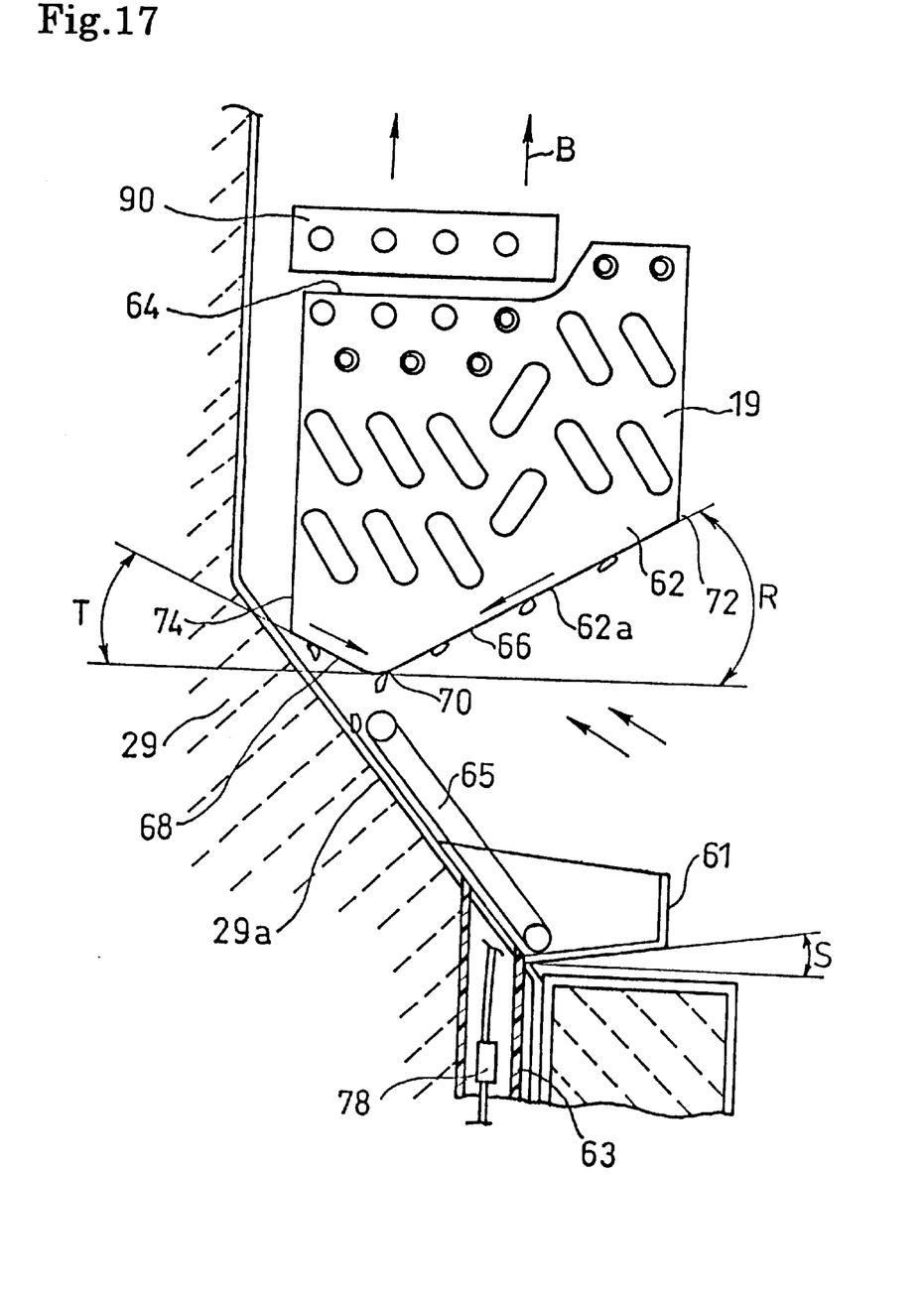
FIG. 17 is a sectional view showing the container side portion of the refrigerating unit.

FIG. 17 shows an arrangement of the evaporator 19 disposed inside the evaporator housing 29. In the evaporator housing 29, a lower portion of the evaporator 19 is inclined toward the interior of the refrigeration container 3 as the lower portion extends the lower direction. The drain pan 61 is provided below the evaporator 19. The drain pan 61 extends to the right and left of the refrigeration container 3 along the extending direction of the evaporator 19. The drainpipe 63 for draining the water in the drain pan 61 is provided on each of the right and left ends of the drain pan 61.

The drain pan 61 is inclined at an angle S such that a portion thereof on the side of an inclined face 29a of the evaporator housing 29 where the drainpipes 63 are provided is lower so as to lead the water received in the drain pan 61 to the drainpipes 63. As a result, the water in the drain pan 61 may be drained easily to prevent the water from being accumulated in the drain pan 61.

According to this embodiment, the drainpipes 63 are formed of resin material having a low heat conductivity to achieve insulation between inside and outside of the refrigeration container 3. Particularly, if a difference between the inside and outside of the refrigeration container 3 is high, reduction of refrigerating efficiency due to an occurrence of heat bridge is prevented by insulating from the outside heat.

The evaporator 19 includes a refrigerant pipe 64 passing through a plurality of fins 62 which are laterally arranged relative to each other. Each fin 62 has a lower edge 62a inclined from the evaporator housing 29 toward the interior of the refrigeration container 3. More specifically, the lower edge 62a according to this embodiment includes a first inclined edge 66 located at the interior side of the container and a second inclined edge 68 at the side of the evaporator housing 29. These edges 66 and 68 meet each other so as to form a corner 70. The first inclined edge 66 is downwardly inclined from a rear edge 72 of a fin 62 toward the evaporator housing 29, and the second inclined edge 68 is inclined from a front edge 74 of the fin 62 toward the interior (inside of the refrigeration container 3). The first inclined edge 66 and the second inclined edge 68 associate with each other to form the corner 70. This corner 70 defines the lowest end of the fin 62. Further, the first inclined edge 66 is shorter than the second inclined edge 68 and the corner 70 is located near the inclined face 29a of the evaporator housing.

Although the inclination angles R and T of the first inclined edge 66 and the second inclined edge 68 are not restricted to any particular values, they are desired to be 20–40°. According to this embodiment, these angles are about 30°. If the inclination angles are smaller than 20°, a sufficient drainage performance cannot be obtained. If the inclination angles are larger than 40°, an effective area of the fin 62 becomes smaller than desired.

Because the lower edge 62a is inclined, water condensed on the surfaces of the fin 62, or water caused by the melting of ice, flows on the surfaces of the fin 62 and gathers on the lower edge 62a so that large water-drops are likely to be formed. Further, because the corner 70 defining the lowest end of the fin 62 is located in the vicinity of the inclined face 29a, water-drops fall on the inclined face 29a, but do not fall directly onto the drain pan 61. Further, because the fin 62 is shaped so as to protrude downwardly so that the corner 70 is formed on the lowest end of the fin 62, the effective area of the fin 62 can be ensured.

Because the lower edge 62a of each fin 62 of the evaporator 19 is shaped so that the area of the lower portion of the fin 62 is increased, a recess portion 64 caved by the same amount as the downward extension area of the fin 62 may be formed at a top end portion of the evaporator 19. A heater core 90 is installed in the recess portion 64. When the interior of the refrigeration container is heated, warm water is passed through the heater core 90.

The heater core 90 is disposed so that the core 90 intersects an air feeding direction B to ensure a predetermined heat exchange area. Thus, a space having the predetermined area for installing the core 90 is necessary. However, because the heater core 90 is disposed in the recess portion 64 of the evaporator 19, no space for the heater core 90 is necessary, thereby achieving a reduction of the size of the unit.

Further, according to this embodiment, a hot gas pipe 65 for defrosting is disposed on the inclined face 29a of the evaporator housing 29 and the drain pan 61. Upon defrosting, a hot refrigerant is passed through the hot gas pipe 65 so as to melt ice formed on the inclined face 29a of the evaporator housing 29 and in the drain pan 61. This hot gas pipe 65 is disposed entirely over the inclined face 29a such that the pipe 65 snakes. The hot gas pipe 65 is not restricted to a hot refrigerant type, but it may be heated by an electric heating wire.

Next, an operation of this embodiment will be described. Upon manufacturing of the refrigerator unit, of major components performing the refrigerating cycle, an evaporator, evaporator fan, condenser, condenser fan and like except the condenser are installed to the evaporator housing so as to be assembled into an integrated unit. Such a unit has been produced easily on the stage of shipment from a manufacturing plant.

Next, the refrigerating unit 9 is mounted on the refrigeration container 3. Upon the mounting on the refrigeration container 3, with the cover 31 of the refrigerating unit 9 removed, the evaporator housing 29 is fitted into the opening portion 27 of the refrigeration container 3 and then bolted to the container 3. This mounting can be achieved easily by fixing both sides of the evaporator housing 29 with the bolts 47. After the mounting, the cover 31 is attached to the evaporator housing 29.

Upon refrigerating operation of the evaporator 29 or defrosting operation, water condensed on the fin 62 or water resulting from the melting of ice flows downward along the surfaces of the fin 62 and gathers at the lower edge 62a of the fin 62. Water-drops collected on the lower edge 62a move along the first inclined edge 66 located inside the refrigeration container 3 toward the corner 70 and the water-drops increase in size as they reach the corner 70. On the other hand, water-drops are also collected on the second inclined edge 68 and move along the inclined edge 68 and arrive at the corner 70. Because water-drops on the fin 62 are collected at the corner 70, the water-drops grow further at the corner 70 so that the water-drops are likely to fall therefrom.

As described above, according to this embodiment, the lower edge of the fin 62 has an excellent draining performance. This prevents formation of a bridge by freezing of remaining water drops during a refrigerating operation to increase the airflow resistance, thereby preventing reduction of the heat exchange efficiency.

The water falling from the corner 70 is received by the inclined face 29a of the evaporator housing 29 and falls down along the inclined face 29a. Then, the water arrives at the drain pan 61. The water collected in the drain pan 61 is led into the drainpipe 63 provided on a front side thereof and is discharged out of the refrigeration container 3. Because the bottom face of the drain pan 61 is inclined, the portion having the drainpipe 63 in the side of the evaporator housing 29 defines the lowest level of the drain pan 61. Thus, the drain pan 61 leads the water easily to the drainpipe 63 and prevents the water from being accumulated in the drain pan 61.

As described above, the water-drops do not fall directly from the corner 70 into the drain pan 61, but are received by the inclined face 29a of the evaporator 29 and guided thereby. As a result, splashes of water due to the falling are prevented.

The present invention is not restricted to the above described embodiments but may be modified in various ways within a range not departing from the gist of the present invention.

For example, it is permissible to dispose a heater 78 inside the drainpipe 63 as shown in FIG. 17 so as to prevent clogging of the drainpipe 63 due to freezing of water therein.

INDUSTRIAL APPLICABILITY

As described above, a refrigerating device according to the present invention is applied to a vehicle and the like having a refrigeration container for carrying a commodity or product at low temperatures, and is used as a device for refrigerating the inside of refrigeration container.

What is claimed is:

1. A refrigerating device for refrigerating a refrigeration container of a vehicle, said refrigerating device comprising:
    an evaporator;
    an evaporator fan;
    a condenser;
    a condenser fan; and
    a housing including a first portion and a second portion, wherein said evaporator, said evaporator fan and said condenser fan are to be mounted inside of said housing and to said first portion, such that when said evaporator, said evaporator fan and said condenser fan are mounted inside of said housing and to said first portion, said first portion, evaporator, evaporator fan and condenser fan form a refrigerating unit that can be mounted to an opening portion of the refrigeration container, whereby when said refrigeration unit is mounted to the opening portion of the refrigeration container, said evaporator and said evaporator fan are located outwardly from an inner wall surface of the refrigeration container; and wherein
    said second portion includes a first air vent provided in a front face of said second portion relative to a traveling direction of the vehicle, a second air vent provided in a top face of said second portion, and a drain hole provided in a bottom face of said second portion.

2. The refrigerating device according to claim 1, wherein said first portion of said housing comprises an evaporator housing and said second portion of said housing comprises a cover, with said evaporator and said evaporator fan to be mounted inside of said evaporator housing and said condenser and said condenser fan to be mounted exteriorly of said evaporator housing and covered by said cover, and wherein said first air vent is provided in a front face of said cover, said second air vent is provided in a top face of said cover, and said drain hole is provided in a bottom face of said cover.

3. The refrigerating device according to claim 2, wherein said drain hole is positioned below said second air vent.

4. The refrigerating device according to claim 3, wherein said evaporator includes a recess positioned so as to be in the path of air flow through said evaporator, and further comprising a heater positioned within said recess.

5. The refrigerating device according to claim 3, and further comprising a drainpipe provided at a lower portion of said evaporator housing and extending from inside said evaporator housing to outside said evaporator housing.

6. The refrigerating device according to claim 5, wherein said drainpipe comprises a resin material.

7. The refrigerating device according to claim 3, wherein said evaporator housing is constructed and arranged to mount said evaporator, said evaporator fan and said condenser fan in varying combinations and amounts by having a plurality of mounting portions provided at mounting locations, with the amount of mounting locations corresponding to the amount of evaporators, evaporator fans and condenser fans.

8. The refrigerating device according to claim 3, wherein said evaporator housing includes an inner surface that is downwardly inclined toward an interior of the refrigeration container when the refrigerating unit is mounted to the opening portion of the refrigeration container, and further comprising a drain pan for receiving water to be positioned at a lower portion of said inner surface when the refrigerating unit is mounted to the opening portion of the refrigeration container such that said inner surface is downwardly inclined towards the interior of the refrigeration container, and wherein said evaporator includes fins each of which has a first edge that is downwardly inclined from the interior of the refrigeration container to a position near said inner surface when the refrigerating unit is mounted to the opening portion of the refrigeration container such that said inner surface is downwardly inclined towards the interior of the refrigeration container.

9. The refrigerating device according to claim 8, wherein each of said fins further has a second edge that is downwardly inclined from a side of said evaporator housing towards said first edge and forms a corner with said first edge when the refrigerating unit is mounted to the opening portion of the refrigeration container such that said inner surface is downwardly inclined towards the interior of the refrigeration container.

10. The refrigerating device according to claim 8, and further comprising a defrosting heater to be positioned on said inner surface of said evaporator housing when the refrigerating unit is mounted to the opening portion of the refrigeration container such that said inner surface is downwardly inclined towards the interior of the refrigeration container.

11. The refrigerating device according to claim 8, and further comprising a drainpipe to be positioned at and extend from a lower portion of said evaporator housing towards the interior of the refrigeration unit so that said drain pan is downwardly inclined towards said drainpipe when the refrigerating unit is mounted to the opening portion of the refrigeration container such that said inner surface of said evaporator housing is downwardly inclined towards the interior of the refrigeration container.

12. The refrigerating device according to claim 11, wherein said evaporator, said drain pan, said drainpipe and said defrosting heater can be incorporated into said evaporator housing such that said evaporator housing, evaporator, drain pan, drainpipe and defrosting heater can be attached as a unit to the refrigeration container.

13. The refrigerating device according to claim 1, wherein said evaporator includes a recess positioned so as to be in the path of air flow through said evaporator, and further comprising a heater positioned within said recess.

14. The refrigerating device according to claim 1, and further comprising a drainpipe provided at a lower portion of said first portion of said housing and extending from inside said first portion of said housing to outside said first portion of said housing.

15. The refrigerating device according to claim 14, wherein said drainpipe comprises a resin material.

16. The refrigerating device according to claim 1, wherein said first portion of said housing is constructed and arranged to mount said evaporator, said evaporator fan and said condenser fan in varying combinations and amounts by having a plurality of mounting portions provided at mounting locations, with the amount of mounting locations corresponding to the amount of evaporators, evaporator fans and condenser fans.

17. The refrigerating device according to claim 1, wherein said first portion of said housing includes an inner surface that is downwardly inclined toward an interior of the refrigeration container when the refrigerating unit is mounted to the opening portion of the refrigeration container, and further comprising a drain pan for receiving water to be positioned at a lower portion of said inner surface when the refrigerating unit is mounted to the opening portion of the refrigeration container such that said inner surface is downwardly inclined towards the interior of the refrigeration container, and wherein said evaporator includes fins each of which has a first edge that is downwardly inclined from the interior of the refrigeration container to a position near said inner surface when the refrigerating unit is mounted to the opening portion of the refrigeration container such that said inner surface is downwardly inclined towards the interior of the refrigeration container.

18. The refrigerating device according to claim 17, wherein each of said fins further has a second edge that is downwardly inclined from a side of said first portion of said housing towards said first edge and forms a corner with said first edge when the refrigerating unit is mounted to the opening portion of the refrigeration container such that said inner surface is downwardly inclined towards the interior of the refrigeration container.

19. The refrigerating device according to claim 17, and further comprising a defrosting heater to be positioned on said inner surface of said first portion of said housing when the refrigerating unit is mounted to the opening portion of the refrigeration container such that said inner surface is downwardly inclined towards the interior of the refrigeration container.

20. The refrigerating device according to claim 17, and further comprising a drainpipe to be positioned at and extend from a lower portion of said first portion of said housing towards the interior of the refrigeration unit so that said drain pan is downwardly inclined towards said drainpipe when the refrigerating unit is mounted to the opening portion of the refrigeration container such that said inner surface of said first portion of said housing is downwardly inclined towards the interior of the refrigeration container.

21. The refrigerating device according to claim 20, wherein said evaporator, said drain pan, said drainpipe and said defrosting heater can be incorporated into said first portion of said housing such that said first portion of said housing, evaporator, drain pan, drainpipe and defrosting heater can be attached as a unit to the refrigeration container.

* * * * *